(12) United States Patent
Nagatsu et al.

(10) Patent No.: US 9,667,925 B2
(45) Date of Patent: May 30, 2017

(54) PROJECTOR

(71) Applicant: Seiko Epson Corporation, Tokyo (JP)

(72) Inventors: Takuro Nagatsu, Kasugai (JP); Yoshiyuki Yanagisawa, Matsumoto (JP); Chigusa Takagi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 14/548,729

(22) Filed: Nov. 20, 2014

(65) Prior Publication Data

US 2015/0156466 A1 Jun. 4, 2015

(30) Foreign Application Priority Data

Dec. 4, 2013 (JP) ................................ 2013-250839

(51) Int. Cl.
*G03B 21/16* (2006.01)
*H04N 9/31* (2006.01)

(52) U.S. Cl.
CPC ........... *H04N 9/3144* (2013.01); *G03B 21/16* (2013.01)

(58) Field of Classification Search
CPC ...... G03B 21/16; G03B 21/14; G03B 21/206; H04N 9/3144; H04N 9/3141; G06F 1/20; G06F 1/203; G06F 1/206; G06F 2200/201
USPC ............ 353/52, 54, 57, 58, 60, 61; 361/676, 361/678, 677, 679.46–679.54
See application file for complete search history.

(56) References Cited

U.S. PATENT DOCUMENTS

| | | | |
|---|---|---|---|
| 8,348,433 B2 | 1/2013 | Yanagisawa et al. | |
| 2007/0024814 A1* | 2/2007 | Woo | H04N 9/3144 353/52 |
| 2008/0018863 A1* | 1/2008 | Hsiao | G03B 21/16 353/54 |
| 2009/0237619 A1 | 9/2009 | Yanagisawa et al. | |

FOREIGN PATENT DOCUMENTS

| | | |
|---|---|---|
| JP | 2009-229955 A | 10/2009 |
| JP | 2009-258622 A | 11/2009 |
| JP | 2010-170148 A | 8/2010 |
| JP | 2010-224440 A | 10/2010 |
| JP | 4561917 B | 10/2010 |
| JP | 2010-250042 A | 11/2010 |
| JP | 4770957 B | 9/2011 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projector includes a cooling device cooling a liquid crystal panel. The cooling device includes a heat receiving part receiving heat of the liquid crystal panel, a Peltier device having a heat absorbing part that absorbs the heat of the heat receiving part and a heat generating part that generates heat when the absorbing part absorbs heat, a heat sink provided so that heat may be transferred to the heat generating part, and a heat pipe containing a hydraulic fluid inside, in which heat is transferred by convection of the hydraulic fluid. The heat sink has a stacking part superimposed on the Peltier device and a projecting part projecting from the Peltier device as seen from the Peltier device side, and the heat pipe has an interior part located between the Peltier device and the stacking part and an extending part extending along the projecting part.

10 Claims, 10 Drawing Sheets

PROJECTOR

BACKGROUND

1. Technical Field

The present invention relates to a projector.

2. Related Art

In related art, a projector including a light source, a light modulator that modulates light output from a light source in response to image information and a projection system that projects the light modulated by the light modulator, and projecting an image on a projection surface such as a screen is known. Recently, higher illuminance of the light source has been desired and optical devices of the light modulator etc. have generated heat at higher temperatures, and thus, a projector for efficiently cooling the optical devices has been proposed (for example, see Patent Document 1 (JP-A-2010-250042)).

A projector disclosed in Patent Document 1 includes a liquid cooling device and a cooling fan. The liquid cooling device includes an optical device holding unit, a liquid pressure feeding unit, a heat receiving jacket, a feed tank, a plurality of liquid circulating members, and a thermoelectric conversion unit. The thermoelectric conversion unit has a thermoelectric conversion device (Peltier device) and a heat-dissipation side heat transfer member (heat sink), and the heat receiving jacket is connected to the Peltier device and the Peltier device is connected to the heat sink. Further, the heat sink is formed to be larger than the Peltier device to project from both sides of the Peltier device as seen from the Peltier device side.

The heat generated in the light modulator is transferred to the cooling liquid via the optical device holding unit and the cooling liquid flows to the heat receiving jacket via the liquid circulating members, and transfers heat to the heat receiving jacket when flowing within the heat receiving jacket. The heat transferred to the heat receiving jacket follows a heat transfer route to the Peltier device and the heat-dissipation side heat transfer member and is dissipated by the air ejected from the cooling fan via a fin member of the heat-dissipation side heat transfer member. The cooling liquid within the heat receiving jacket is cooled when the heat is dissipated by the thermoelectric conversion unit, flows to the optical device holding unit via the liquid circulating members etc., and cools the light modulator.

However, in the thermoelectric conversion unit disclosed in Patent Document 1, it may be considered that the heat received by the heat receiving jacket is not efficiently transferred to both sides of the heat sink, and it may be difficult that the cooling liquid is cooled to a desired temperature. Or, further upsizing of the heat sink is inefficient as means for transferring heat to the whole heat sink. Upsizing of the cooling device is problematic, and increase in wind speed of the cooling fan leads to a problem of increase in noise.

SUMMARY

An advantage of some aspects of the invention is to solve at least a part of the problems described above, and the invention can be implemented as the following forms or application examples.

Application Example 1

This application example is directed to a projector that modulates light output from a light source in response to image information and projects the modulated light, including a cooling device that cools an optical device within the projector, and the cooling device includes a heat receiving part that receives heat of the optical device, a thermoelectric conversion element having a heat absorbing part that absorbs the heat of the heat receiving part and a heat generating part that generates heat when the absorbing part absorbs heat, a heat sink provided so that heat may be transferred to the heat generating part, and a heat pipe containing a hydraulic fluid inside, in which heat is transferred by reception of heat of the heat generation part and convection of the hydraulic fluid, wherein the heat sink has a stacking part superimposed on the thermoelectric conversion element and a projecting part projecting from the thermoelectric conversion element as seen from the thermoelectric conversion element side, and the heat pipe has an interior part located between the thermoelectric conversion element and the stacking part and an extending part extending along the projecting part.

The heat pipe has a configuration in which the hydraulic fluid is enclosed within a tubular member. The hydraulic fluid is evaporated in an evaporation part and the vapor moves to a condensation part and condensed into a liquid in the condensation part, and circulates to the evaporation part, and thereby, heat is transferred.

According to the configuration, the heat sink has the stacking part and the projecting part and is formed to be larger than the thermoelectric conversion element. Further, the heat pipe has the interior part located between the thermoelectric conversion element and the stacking part of the heat sink and the extending part extending along the projecting part as described above. That is, the heat generated by the heat generating part of the thermoelectric conversion element transfers to the stacking part and the interior part.

Thereby, in the heat pipe, the interior part may be formed as the evaporation part and the extending part may be formed as the condensation part, and accordingly, the heat transferring from the thermoelectric conversion element may be sufficiently transferred to the projecting part of the heat sink by the heat pipe. Thus, the heat that is failed to be sufficiently transferred from the stacking part to the projecting part in the heat sink in the configuration without the heat pipe may be efficiently transferred to the projecting part with the heat pipe. Thereby, even when the heat sink larger than the thermoelectric conversion element is formed, the performance of the heat sink may be sufficiently exhibited for dissipation of the heat of the heat receiving part, and the optical device may be efficiently cooled. Therefore, the projector that may project images with better image quality over a longer period may be provided.

Further, in the configuration in which the projector includes the cooling fan for dissipating the heat of the heat sink, a smaller cooling fan may be used and the cooling fan may be driven with lower power, and thereby, upsizing and noise of the projector may be suppressed.

Application Example 2

In the projector according to the application example described above, it is preferable that the cooling device includes a plurality of the thermoelectric conversion elements arranged in parallel, and the projecting part is provided in a parallel arrangement direction of the plurality of thermoelectric conversion elements.

According to the configuration, the plurality of thermoelectric conversion elements are provided, and the projecting part of the heat sink is provided in the parallel arrangement direction of the plurality of thermoelectric conversion elements. Thereby, compared to the case of using single thermoelectric conversion element, desired thermoelectric conversion performance may be exhibited even using the smaller thermoelectric conversion element. The direction orthogonal to the parallel arrangement direction is along the thickness direction of the projector, and thus, increase in thickness of the projector may be suppressed and the optical device may be efficiently cooled.

Further, the number of thermoelectric conversion elements may be set in response to projectors requiring different cooling performance, and thus, the thermoelectric conversion elements may be commonalized and mounted on various projectors without newly manufacturing of thermoelectric conversion elements in different sizes.

Application Example 3

In the projector according to the application example described above, it is preferable that the cooling device further includes a heat transfer member provided between the heat receiving part and the plurality of thermoelectric conversion elements for transferring the heat of the heat receiving part to the heat absorbing parts of the plurality of thermoelectric conversion elements, and the heat transfer member has a size covering the plurality of thermoelectric conversion elements as seen from the heat receiving part side.

According to the configuration, even when the size of the heat receiving part is smaller so that the heat receiving part may partially overlap with the plurality of thermoelectric conversion elements as seen from the heat receiving part side, the heat from the heat receiving part may be transferred by single heat receiving part to all absorbing parts of the plurality of thermoelectric conversion elements via the heat transfer member. Thereby, the performance of the thermoelectric conversion elements may be sufficiently exhibited for allowing the heat absorbing parts to efficiently absorb the heat from the heat receiving part and allowing the heat generating parts to generate heat.

Further, the number of thermoelectric conversion elements is set in response to projectors requiring different cooling performance of the cooling devices and the heat transfer members having the sizes matching the plurality of thermoelectric conversion elements are used, and thereby, the projector that can efficiently cool the optical device may be obtained without newly manufacturing of heat receiving parts in larger sizes. Therefore, the expensive heat receiving part having the complex structure may be formed as a common member that can be mounted on various projectors.

Application Example 4

In the projector according to the application example described above, it is preferable that the projecting part in the heat sink has a first projecting part located at one side of the stacking part and a second projecting part located at the other side of the stacking part, and the extending part in the heat pipe has a first extending part along the first projecting part and a second extending part along the second projecting part.

According to the configuration, in the heat sink, the projection parts (first projecting part and second projecting part) are provided on both sides of the stacking part, and the heat pipe has the extending parts (first extending part and second extending part) respectively along the projecting parts on both sides. Thereby, the heat transferring from the thermoelectric conversion element to the stacking part may be diffused to both sides of the stacking part and the heat transferring from the thermoelectric conversion element to the interior part of the heat pipe may be transferred from the extending parts to the projecting parts on both sides of the stacking part. Thus, the performance of the heat sink may be more efficiently exhibited for dissipation of the heat of the heat receiving part and the optical device may be efficiently cooled.

Application Example 5

In the projector according to the application example described above, it is preferable that an amount of projection of the first projecting part from the thermoelectric conversion element is smaller than an amount of projection of the second projecting part from the thermoelectric conversion element, and the cooling device further includes a cooling fan that blows cooling air from the first projecting part side to the heat sink.

According to the configuration, the cooling air is blown from the side at which the amount of projection from the thermoelectric conversion element is smaller (the first projecting part side) toward the side at which the amount is larger (the second projecting part side). Thereby, in the heat sink, the cooling air is blown to the heat sink from the side nearer the stacking part to which the heat transfers from the thermoelectric conversion element, i.e., the part in which the temperature is higher in the heat sink, and thus, the heat of the heat sink may be more efficiently dissipated.

Application Example 6

In the projector according to the application example described above, it is preferable that the heat pipe has a capillary-shaped channel for moving the hydraulic fluid by a capillary force.

According to the configuration, the heat pipe is formed to move the hydraulic fluid by the capillary force, and thereby, even in a position in which the interior part (evaporation part) is located above the extending part (condensation part), may move heat from the interior part (evaporation part) to the extending part (condensation part). Thus, the projector may project images not only in the horizontal position in which landscape images are projected but also in various positions such as a vertical position rotated to 90° from the horizontal position, in which portrait images are projected and positions in which landscape images and portrait images are projected above and below by stably cooling the optical device to suppress deterioration of the optical device.

Application Example 7

In the projector according to the application example described above, it is preferable that the heat receiving part has a channel in which a cooling liquid circulates inside, and the cooling device further includes an optical device holding unit having a channel in which the cooling liquid circulates inside and holding the optical device, a liquid pressure feeding unit that suctions and pressure-feeds the cooling liquid, a feed tank that retains the cooling liquid inside, a tubular member that connects the optical device holding unit, the liquid pressure feeding unit, the feed tank, and the heat receiving part so that the cooling liquid may annularly circulate in the optical device holding unit, the liquid pressure feeding unit, the feed tank, and the heat receiving part.

According to the configuration, the cooling device includes the liquid pressure feeding unit, the feed tank, the heat receiving part, the optical device holding unit, and the tubular member, and has an annular channel in which the cooling liquid circulates formed therein.

Thereby, the heat generated in the optical device due to the light from the light source may be transferred to the heat receiving part via the cooling liquid. Further, as described above, the cooling device efficiently transfers the heat of the heat receiving part to the heat sink using the thermoelectric conversion element and the heat pipe, and accordingly, the cooling liquid may be efficiently cooled. Thus, cooling of the optical device holding unit in which the cooling liquid cooled in the heat receiving part circulates, and efficient cooling of the optical device may be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, a projector according to the first embodiment will be explained with reference to the drawings.

The projector of the embodiment modulates light output from a light source in response to image information and enlarges and projects the modulated light on a projection surface such as a screen.

Main Configuration of Projector

Figure 1:
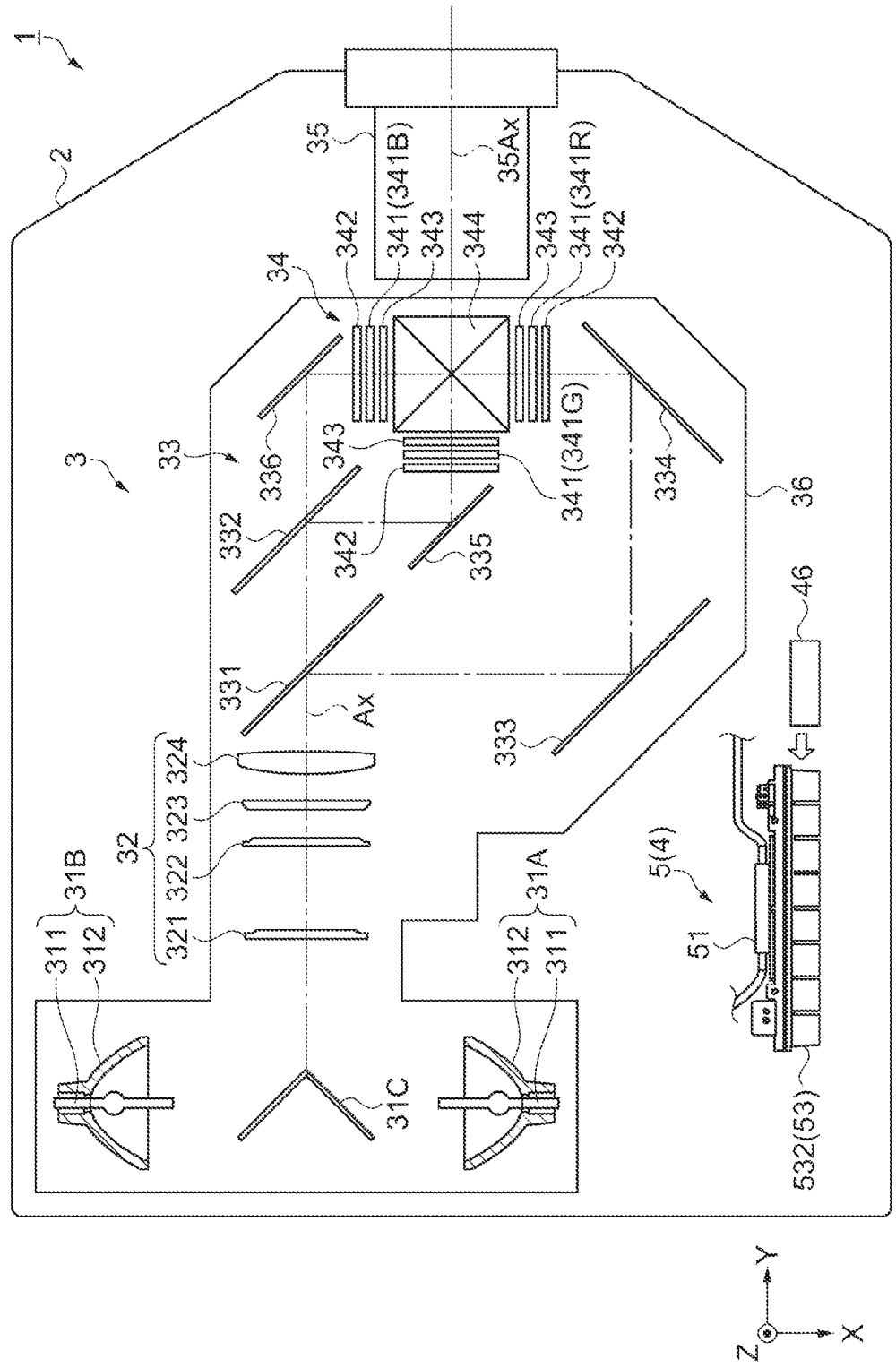
FIG. 1 is a schematic diagram showing a main configuration of a projector of the first embodiment.

FIG. 1 is a schematic diagram showing a main configuration of a projector 1 of the first embodiment.

As shown in FIG. 1, the projector 1 includes an exterior housing 2 forming an exterior, a control unit (not shown), an optical unit 3 having light sources 311, and a cooling device 4. Though not illustrated, a power supply device that supplies power to the light sources 311 and the control unit etc. are provided inside of the exterior housing 2. Note that, in FIG. 1, only a part of the cooling device 4 is shown. Further, as below, for convenience of explanation, an output direction of light modulated in the projector 1 is referred to as a +Y-direction (anterior direction), the upside of the projector 1 in a horizontal position for projection of landscape images on a projection surface placed on a wall or the like is referred to as a +Z-direction, and the right side of the projector 1 in the horizontal position as seen from behind is referred to as a +X-direction.

Though the detailed explanation will be omitted, the exterior housing 2 is formed by assembly of a plurality of members. An opening part through which the modulated light passes, an intake port for taking outside air, and an exhaust port from which inside air is exhausted are provided in the housing.

The control unit includes a CPU (Central Processing Unit), a ROM (Read Only Memory), a RAM (Random Access Memory), etc. and functions as a computer, and performs control of operation of the projector 1, for example, control with respect to projection of images, control with respect to operation of the cooling device 4, etc.

The optical unit 3 modulates the light output from the light sources 311 in response to image information under the control of the control unit, and projects the modulated light on the projection surface.

As shown in FIG. 1, the optical unit 3 includes a pair of light source devices 31A, 31B, a reflection mirror 31C, an illumination optical device 32, a color separation optical device 33, an optical device 34 having a light modulator, a projection lens 35 as a projection optical device, and an optical component casing 36 that houses the respective members 31A, 31B, 32 to 34 inside.

The pair of light source devices 31A, 31B have the same configuration and each has the discharge light source 311 and a reflector 312. Further, the pair of light source devices 31A, 31B are oppositely provided with the reflection mirror 31C in between for outputting luminous flux toward the reflection mirror 31C. The luminous flux output from the pair of light source devices 31A, 31B is reflected by the reflection mirror 31C along an illumination optical axis Ax set inside of the optical component casing 36 and applied to the illumination optical device 32.

The illumination optical device 32 includes lens arrays 321, 322, a polarization conversion element 323, and a superimposing lens 324. The lens arrays 321, 322 and the superimposing lens 324 nearly homogenize the light output from the light source devices 31A, 31B on the surface of the light modulator. The polarization conversion element 323 equalizes the random light output from the lens array 322 into first linearly-polarized light that can be used in the light modulator.

The color separation optical device 33 includes dichroic mirrors 331, 332 and reflection mirrors 333 to 336, and separates the light output from the illumination optical device 32 into red light (R-light), green light (G-light), and blue light (B-light).

The optical device 34 includes three liquid crystal panels 341 as the light modulator (a liquid crystal panel for R-light 341R, a liquid crystal panel for G-light 341G, a liquid crystal panel for B-light 341B), light incident-side polarizers 342 and light exiting-side polarizers 343 respectively provided at the light incident sides and the light exiting sides of the respective liquid crystal panels 341, and a cross dichroic prism 344 as a light combining optical device.

The liquid crystal panel 341 has a rectangular image formation area in which a plurality of minute pixels (not shown) are provided in a matrix form, and the respective pixels are set to have light transmittances in response to image information. The respective color lights separated by the color separation optical device 33 are respectively modulated by the respective liquid crystal panels 341 in response to image information, combined by the cross dichroic prism 344, and projected on the screen or the like (not shown) by the projection lens 35.

The cooling device 4 cools the liquid crystal panels 341 as the optical device by circulating a cooling liquid of propylene glycol or the like along an annular channel. Though the detailed explanation is omitted, the other optical components than the liquid crystal panels 341, fans, ducts, etc. for cooling the power supply device etc. are provided within the projector 1.

Figure 2:
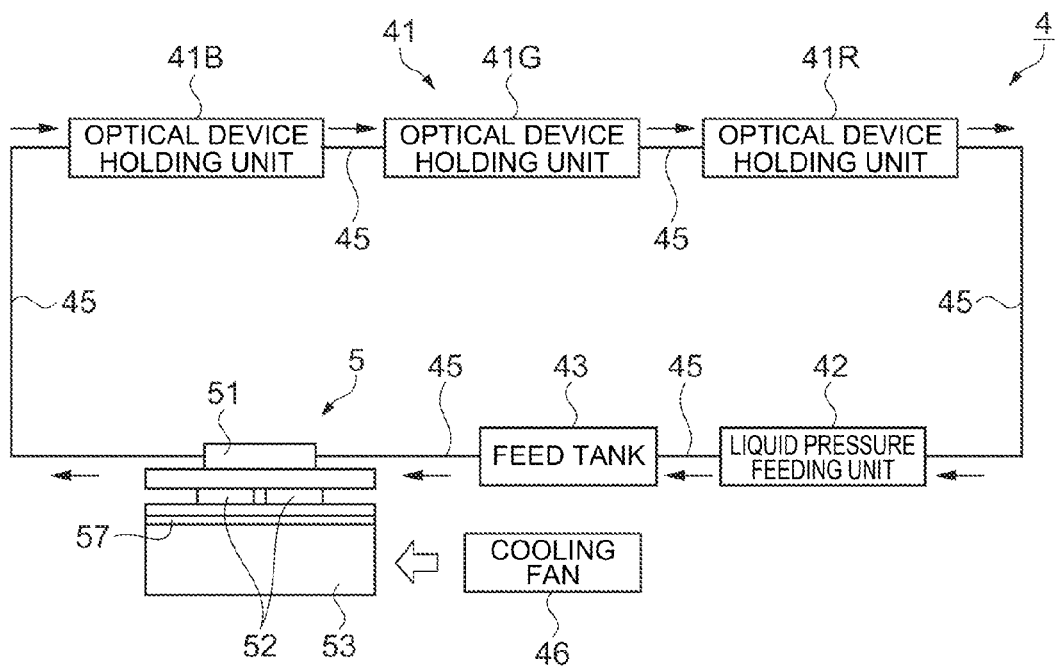
FIG. 2 is a block diagram showing a main configuration of a cooling device in the first embodiment.

FIG. 2 is a block diagram showing a main configuration of the cooling device 4.

As shown in FIG. 2, the cooling device 4 includes three optical device holding units 41, a liquid pressure-feed unit 42, a feed tank 43, a heat exchange unit 5, a plurality of tubular members 45, and a cooling fan 46.

Though the detailed illustration is omitted, the three optical device holding units 41 respectively hold the liquid crystal panels 341R, 341G, 341B and have channels for circulating the cooling liquid provided inside. The optical device holding unit 41 for the liquid crystal panel 341R is denoted as 41R, the optical device holding unit 41 for the liquid crystal panel 341G is denoted as 41G, and the optical device holding unit 41 for the liquid crystal panel 341B is denoted as 41B.

The liquid pressure-feed unit 42 is a pump that suctions and pressure-feeds the cooling liquid and circulates the cooling liquid along the annular channel. A suction port from which the cooling liquid is suctioned and an outflow port from which the cooling liquid is fed with pressure are provided in the liquid pressure-feed unit 42.

The feed tank 43 is formed in a nearly rectangular parallelepiped using a member with higher thermal conductivity of aluminum or the like, retains the cooling liquid inside, and feeds the cooling liquid flowing in the annular channel.

An injection port for injection of the cooling liquid to inside, an inflow port from which the cooling liquid flows in, and an outflow port from which the cooling liquid flows out are provided in the feed tank 43. That is, after the assembly of the cooling device 4, the cooling liquid is injected from the injection port into the feed tank 43.

The tubular members 45 are formed using members having flexibility and, as shown in FIG. 2, connect between the respective members for circulation of the cooling liquid sequentially through the optical device holding unit 41B, the optical device holding unit 41G, the optical device holding unit 41R, the liquid pressure-feed unit 42, the feed tank 43, a heat receiving part 51, which will be described later, and the optical device holding unit 41B.

The heat exchange unit 5 includes the heat receiving part 51, Peltier devices 52 as thermoelectric conversion devices, a heat sink 53, etc., which will be described later in detail. The heat exchange unit 5 receives the heat of the liquid crystal panels 341 generated by application of the light from the light sources 311 using the heat receiving part 51 via the optical device holding units 41 and the cooling liquid, and transfers the heat to the heat sink 53 via the Peltier devices 52 etc.

The cooling fan 46 includes a sirocco fan, and blows cooling air to the heat sink 53 of the heat exchange unit 5 and dissipates the heat generated by the heated heat sink 53.

Configuration of Heat Exchange Unit

Here, the heat exchange unit 5 will be explained in detail.

Figure 3A:
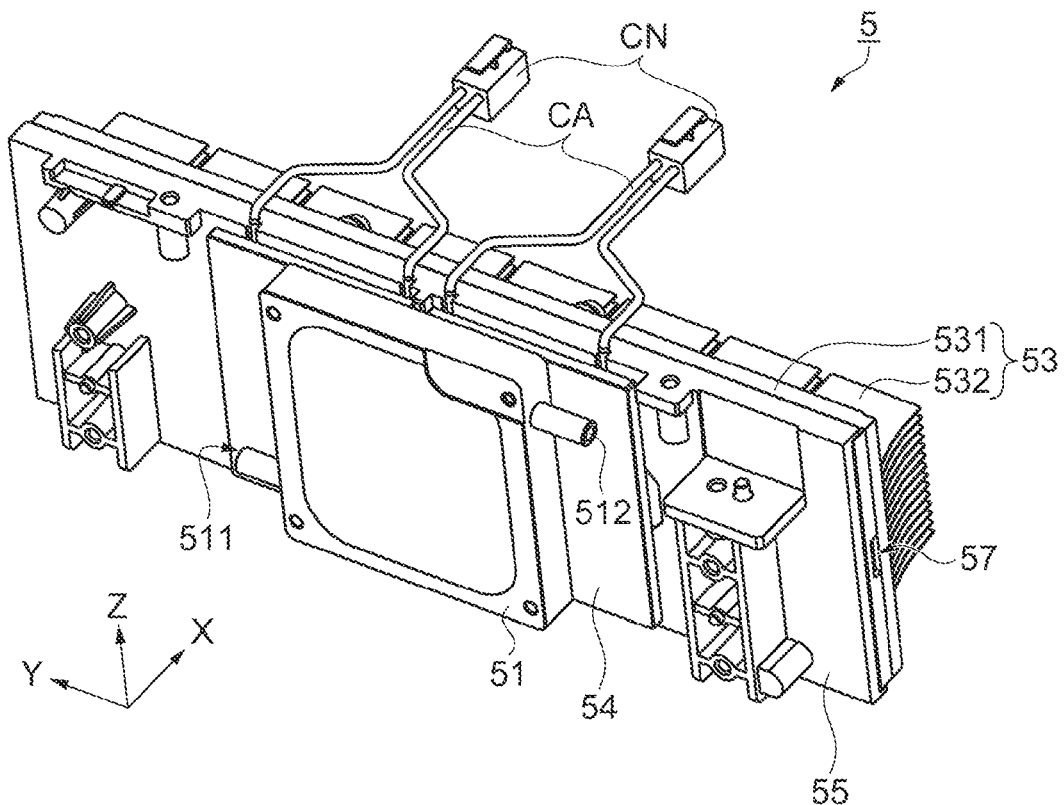
FIGS. 3A and 3B are perspective views of a heat exchange unit in the first embodiment.
Figure 3B:
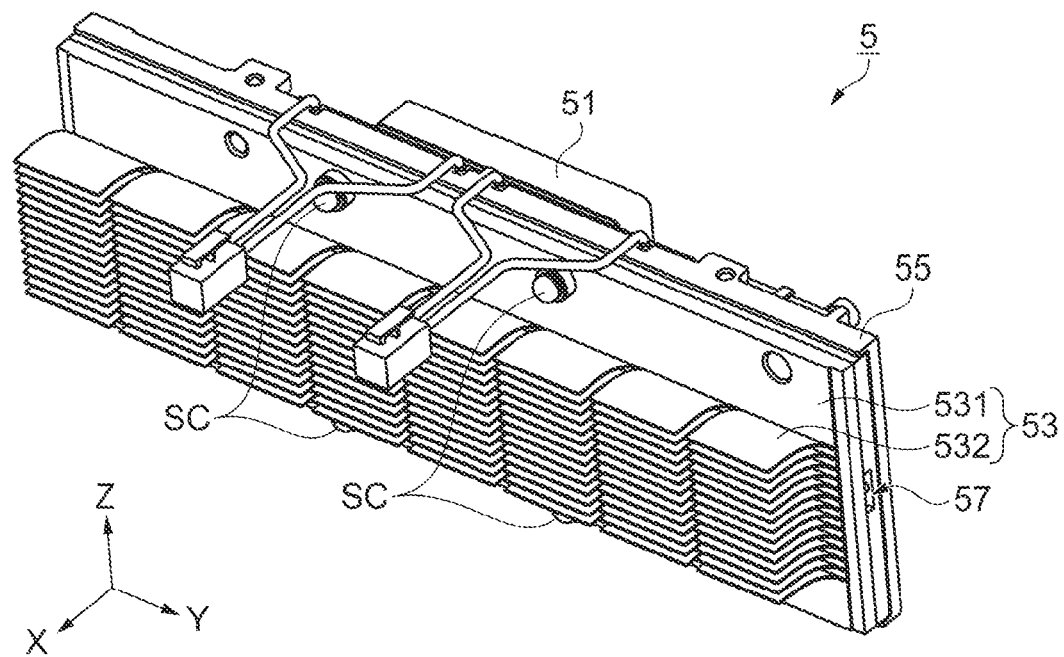
Figure 4A:
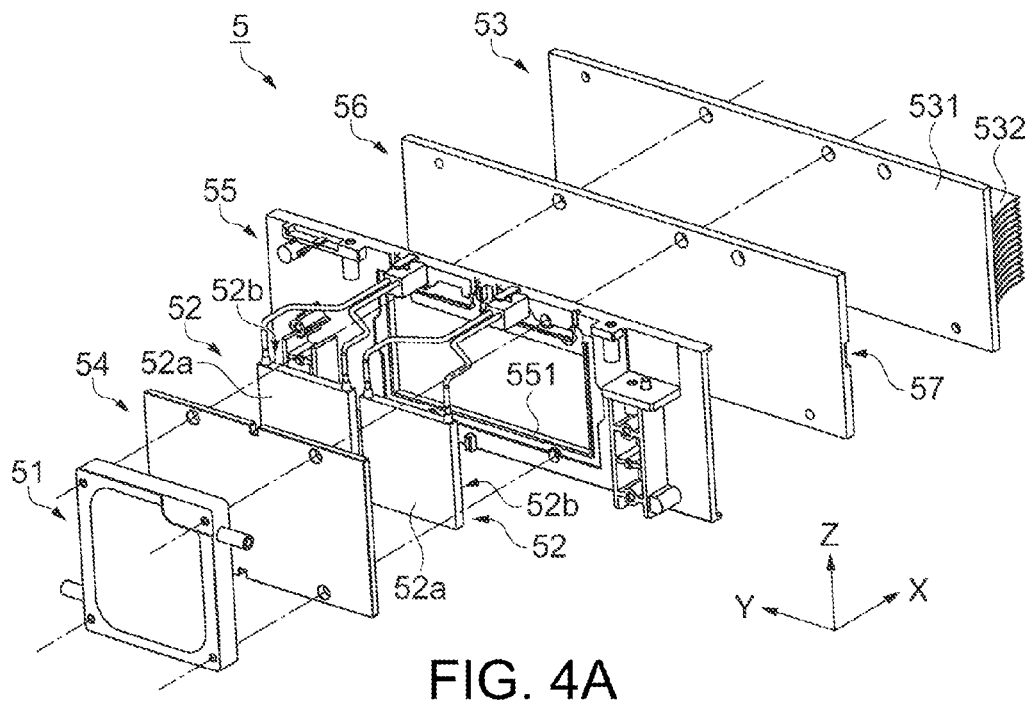
FIGS. 4A and 4B are exploded views of the heat exchange unit in the first embodiment.
Figure 4B:
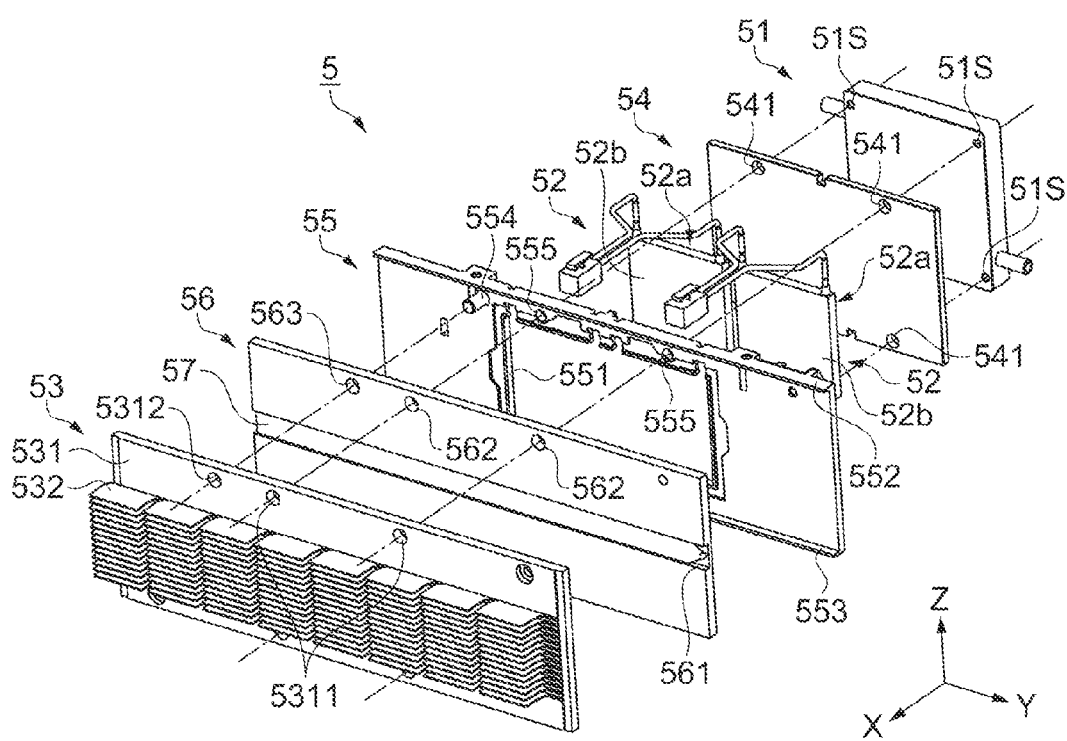
Figure 5:
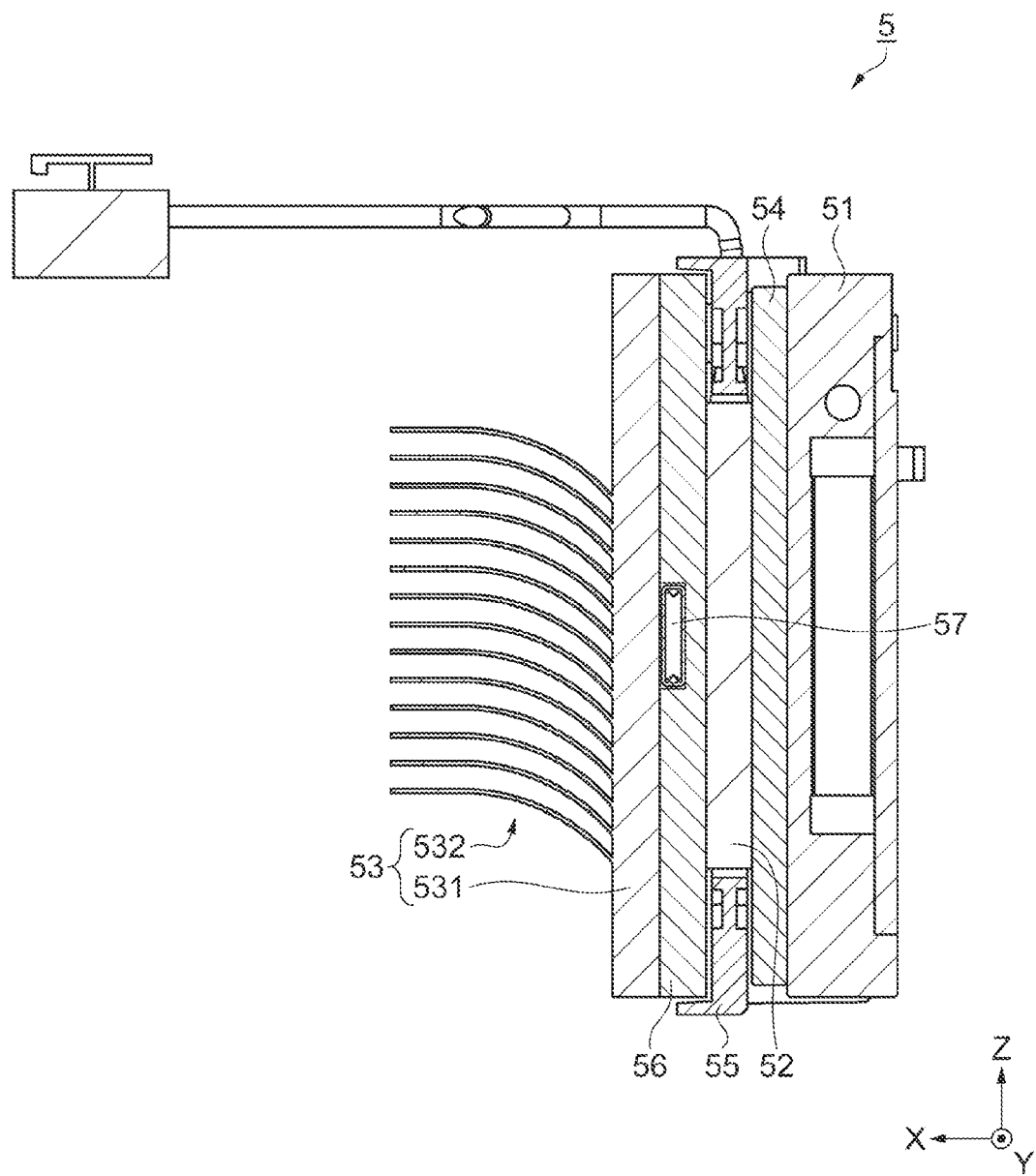
FIG. 5 is a sectional view of the heat exchange unit in the first embodiment.

FIGS. 3A and 3B are perspective views of the heat exchange unit 5, and FIG. 3A is an oblique posterior view and FIG. 3B is an oblique anterior view. FIGS. 4A and 4B are exploded views of the heat exchange unit 5, and FIG. 4A is an oblique posterior view and FIG. 4B is an oblique anterior view. FIG. 5 is a sectional view of the heat exchange unit 5.

As shown in FIGS. 3A to 4B, the heat exchange unit 5 includes a heat transfer member 54, a fixing frame 55, a support member 56, and a heat pipe 57 in addition to the heat receiving part 51, the Peltier devices 52, and the heat sink 53.

As shown in FIG. 5, the heat exchange unit 5 has a configuration in which the heat receiving part 51, the heat transfer member 54, the Peltier devices 52, and the heat pipe 57 fixed to the support member 56, and the heat sink 53 are stacked.

The heat receiving part 51 includes a plurality of micro channels (not shown) in which the cooling liquid flows inside of the nearly parallelepiped outer shape and an inflow port 511 and an outflow port 512 (see FIG. 3A) communicating with the channels, and has a structure of an heat exchanger such as the so-called microchannels. Further, the heat receiving part 51 receives heat from the cooling liquid flowing from the inflow port 511 and in the micro channels. The cooling liquid flowing in the micro channels flows out from the outflow port 512.

Further, as shown in FIG. 4B, screw grooves 51S in which screws SC (see FIG. 3B) are screwed are formed in four corners of the heat receiving part 51.

The heat transfer member 54 is formed in a plate form using aluminum or the like, provided between the heat receiving part 51 and the two Peltier devices 52, and transfers the heat of the heat receiving part 51 to the two Peltier devices 52. Further, as shown in FIG. 3A, the heat transfer member 54 has a rectangular shape in the plan view, and the size in the lateral direction is formed to be nearly equal to the size of the heat receiving part 51 and the size in the longitudinal direction is formed to be larger than the size of the heat receiving part 51. Further, the heat receiving part 51 is provided nearly at the center in the longitudinal direction of the heat transfer member 54.

Further, as shown in FIG. 4B, in the heat transfer member 54, insertion holes 541 in which the screws SC (see FIG. 3B) are inserted are formed in locations corresponding to the screw grooves 51S of the heat receiving part 51.

The two Peltier devices 52 have the same configuration and the same size.

Though the specific illustration is omitted, the Peltier device 52 has a plurality of PN junctions in which p-type semiconductor and n-type semiconductor are joined by a metal piece, and a heat absorbing part 52a is provided on one side and a heat generating part 52b is provided on the other side. The two Peltier devices 52 are arranged in parallel along the longitudinal direction of the heat transfer member 54 so that the heat absorbing part 52a may transfer heat to the heat transfer member 54. Further, when power is supplied, the Peltier device 52 absorbs heat of the heat receiving part 51 with the heat absorbing part 52a via the heat transfer member 54 and generates heat with the heat generating part 52b. As shown in FIG. 3A, cables CA and connectors CN are connected to the Peltier devices 52 and power is supplied from the power supply device via the cables CA and the connectors CN.

Figure 6A:
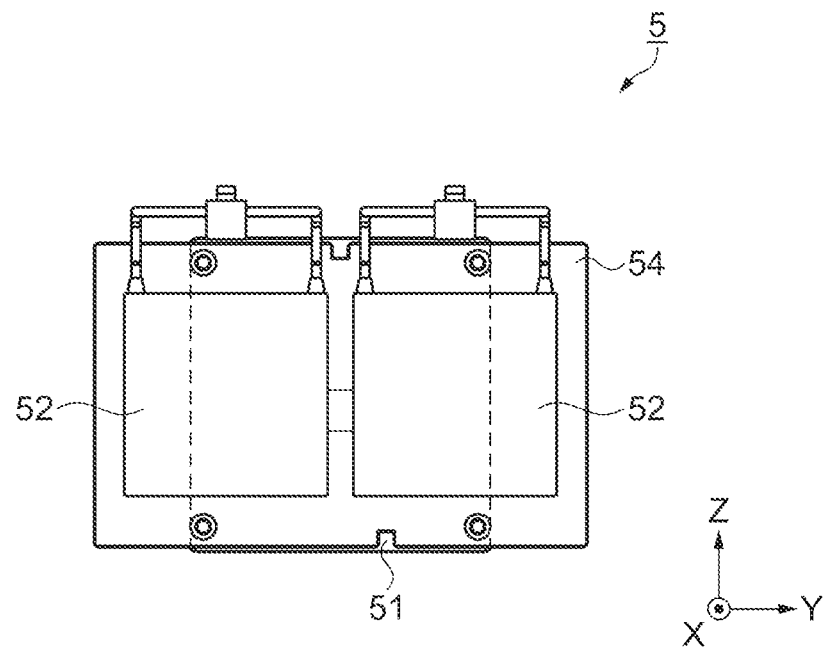
FIGS. 6A and 6B are plan views of the heat exchange unit in the first embodiment.
Figure 6B:
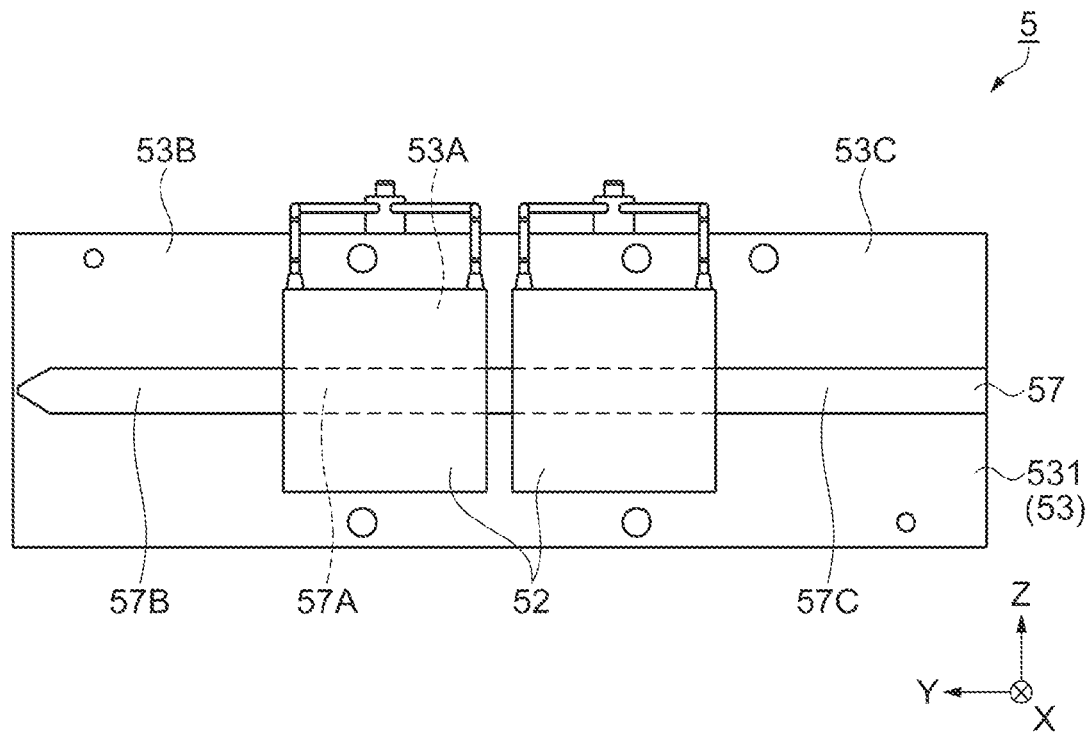

FIGS. 6A and 6B are plan views of the heat exchange unit 5, and FIG. 6A shows a positional relation among the heat receiving part 51, the heat transfer member 54, and the two Peltier device 52 and FIG. 6B shows a positional relation among the two Peltier device 52, the heat pipe 57, and the heat sink 53.

The Peltier device 52 is formed in a nearly rectangular parallelepiped shape and has a smaller planar size than the planar size of the heat receiving part 51 in both of the longitudinal and lateral directions. Further, as shown in FIG. 6A, the two Peltier devices 52 arranged in parallel are provided nearly at the center of the heat receiving part 51 in the lateral directions (Z-directions) of the heat transfer member 54 and to partially project from the heat receiving part 51 in the longitudinal directions (Y-directions) of the heat transfer member 54.

On the other hand, as shown in FIG. 6A, the heat transfer member 54 has a shape covering the two Peltier devices 52 arranged in parallel, and the two Peltier devices 52 are provided nearly at the center of the heat transfer member 54.

As described above, the heat transfer member 54 is provided so that heat may be transferred in the heat receiving part 51, and the two Peltier devices 52 are provided so that heat may be transferred in the heat transfer member 54. Further, the heat of the heat receiving part 51 is transferred to the two Peltier devices 52 via the heat transfer member 54.

In a configuration without the heat transfer member 54, the two Peltier devices 52 arranged in parallel project from the heat receiving part 51, and thereby, part of the heat absorbing parts 52a of the Peltier devices 52 do not sufficiently fulfill the function of absorbing the heat from the heat receiving part 51. However, via the heat transfer member 54, the heat from the heat receiving part 51 may be absorbed using the whole heat absorbing parts 52a of the Peltier devices 52.

The fixing frame 55 is formed using a synthetic resin or the like, and has a function of holding the two Peltier devices 52 and a function of positioning the support member 56 and the heat sink 53.

As shown in FIGS. 4A and 4B, the fixing frame 55 is formed in a rectangular shape in the plan view, the size in the longitudinal direction is formed to be larger than the size of the heat transfer member 54 in the longitudinal direction, and an opening part 551 in which the two Peltier devices 52 are disposed is provided at the center. The heat absorbing parts 52a and the heat generating parts 52b are exposed from the fixing frame 55 and a sealing agent is injected between the outer edge and the peripheral edge of the opening part 551, and thereby, the two Peltier devices 52 are held by the fixing frame 55.

Further, as shown in FIG. 4B, ribs 552, 553 standing toward the support member 56 side for positioning the support member 56 and a cylindrical projection 554 for positioning the support member 56 and the heat sink 53 are provided on the fixing frame 55. Furthermore, insertion holes 555 in which the screws SC (see FIG. 3B) are inserted are formed in locations corresponding to the screw grooves 51S of the heat receiving part 51.

The support member 56 is a member provided between the two Peltier devices 52 and the heat sink 53, and has a function of transferring the heat of the heat generating parts 52b of the two Peltier devices 52 to the heat sink 53 and the heat pipe 57 and a function of supporting the heat pipe 57.

The support member 56 is formed in a rectangular plate shape in the plan view using a thermally conductive member of aluminum or the like having the shape in the longitudinal direction nearly in the same size as the size of the fixing frame 55 in the longitudinal direction, and provided between the ribs 552, 553 of the fixing frame 55.

Further, as shown in FIG. 4B, a concave portion 561 located at the center in the lateral direction and extending in the longitudinal direction is provided on the surface of the support member 56 at the heat sink 53 side. The concave portion 561 is formed in a size in which the heat pipe 57 is fitted.

Furthermore, as shown in FIG. 4B, in the support member 56, insertion holes 562 in which the screws SC (see FIG. 3B) are inserted are formed in locations corresponding to the screw grooves 51S of the heat receiving part 51 and a positioning hole 563 in which the projection 554 of the fixing frame 55 is inserted is provided.

The heat pipe 57 has a configuration in which a tubular member of copper or the like contains a hydraulic fluid, and transfers heat by evaporation and condensation of the hydraulic fluid due to reception of the heat of the heat generating parts 52b of the Peltier devices 52 via the support member 56. Further, the heat pipe 57 has a capillary-shaped channel formed using a sintered metal or the like inside and moves the hydraulic fluid by a capillary force.

As shown in FIG. 4B, the heat pipe 57 of the embodiment has a shape extending nearly along a straight line and is provided in the concave part 561 of the support member 56.

As shown in FIG. 5, the heat pipe 57 is formed so that the surface at the heat sink 53 side may be nearly flush with the surface of the support member 56 at the heat sink 53 side when provided in the concave part 561. Further, when the support member 56 to which the heat pipe 57 is attached and the heat sink 53 are assembled, good thermal transfer is obtained between the support member 56 and the heat sink 53 and between the heat pipe 57 and the heat sink 53.

The heat sink 53 is formed using aluminum or the like and, as shown in FIGS. 3A and 4B, has a plate-like base part 531 and a plurality of fins 532 projecting from one surface of the base part 531.

The base part 531 has a planar shape equal to the planar shape of the support member 56, is superimposed on the support member 56 by which the heat pipe 57 is supported, and provided so that heat may be transferred to the support member 56 and the heat pipe 57. That is, the heat sink 53 is provided so that heat may be transferred to the heat generating parts 52b of the Peltier devices 52 via the support member 56.

As shown in FIG. 6B, the base part 531 and the support member 56 are formed in sizes in the lateral direction to cover the Peltier devices 52, and the two Peltier devices 52 are provided nearly at the center in the longitudinal direction with respect to the base part 531 and the support member 56.

Further, as shown in FIG. 6B, the heat sink 53 has a stacking part 53A superimposed on the two Peltier devices 52, and a first projecting part 53B and a second projecting part 53C provided in the parallel arrangement direction of the Peltier devices 52 as seen from the Peltier device 52 side. The first projecting part 53B is provided anterior (+Y-direction) to the stacking part 53A and the second projecting part 53C is provided posterior (−Y-direction) to the stacking part 53A. The first projecting part 53B and the second projecting part 53C respectively project from the Peltier devices 52 as seen from the Peltier device 52 side and the amounts of projection (the lengths of the heat sink 53 in the longitudinal directions (Y-directions)) from the respective Peltier devices 52 are nearly equal.

Further, as shown in FIG. 4B, in the base part 531, insertion holes 5311 in which the screws SC (see FIG. 3B) are inserted are provided in locations corresponding to the screw grooves 51S of the heat receiving part 51 and a positioning hole 5312 in which the projection 554 of the fixing frame 55 is inserted is provided.

The plurality of fins 532 are continuously cut and raised in thin plate shapes and integrally formed with the base part 531, and intermittently extend along the longitudinal direction of the base part 531. Further, the plurality of fins 53 extend along the extension direction of the heat pipe 57.

As shown in FIG. 6B, the heat pipe 57 is provided so that the center part may be superimposed on the two Peltier devices 52 as seen from the Peltier device 52 side.

Specifically, the heat pipe 57 has an interior part 57A located so that heat may be transferred between the two Peltier devices 52 and the stacking part 53A of the heat sink 53, and a first extending part 57B and a second extending part 57C extending along the first projecting part 53B and the second projecting part 53C, respectively.

Like the first projecting part 53B and the second projecting part 53C having the nearly equal lengths in the longitudinal direction of the heat sink 53, the length of the first extending part 57B and the length of the second extending part 57C are formed to be nearly equal.

Further, in the heat pipe 57, the interior part 57A has a function of an evaporation part that evaporates the hydraulic fluid, the first extending part 57B and the second extending part 57C have functions of condensation parts, and thereby, heat is transferred between the interior part 57A and the first extending part 57B, the second extending part 57C.

The screws SC inserted from the side on which the fins 532 of the heat sink 53 are formed (+X side in FIG. 4B) into the insertion holes 5311, 562, 555, 541 are screwed into the screw grooves 51S of the heat receiving part 51, and thereby, the heat exchange unit 5 is integrated.

The heat exchange unit 5 is integrated, and thereby, heat transfer routes from the heat receiving part 51 through the heat transfer member 54 and the Peltier devices 52 to the support member 56, from the support member 56 through the heat pipe 57 to the heat sink 53, and from the support member 56 to the heat sink 53 are formed. For higher thermal conductivity, thermally-conductive grease may be applied between the members provided so that heat may be transferred to each other, e.g., between the Peltier devices 52 and the support member 56 and between the support member 56 to which the heat pipe 57 is attached and the heat sink 53.

Then, as shown in FIG. 1, in the integrated heat exchange unit 5, the heat receiving part 51 is provided to be located on the left side (−X side) of the heat sink 53 with the longitudinal direction of the heat sink 53 nearly along the Y-direction. That is, the heat exchange unit 5 is provided so that the direction orthogonal to the parallel arrangement direction in which the two Peltier devices 52 are arranged in parallel may be along the thickness direction of the projector 1. Further, as shown in FIG. 1, the cooling fan 46 is provided to blow cooling air from the anterior to the heat exchange unit 5 (+Y-direction) along the direction in which the plurality of fins 532 extend.

Cooling Operation

Here, the cooling operation by the cooling device 4 will be explained.

The liquid pressure-feed unit 42 is driven, and thereby, the cooling device 4 convects the cooling liquid in the order of the liquid pressure-feed unit 42, the feed tank 43, the heat exchange unit 5, the optical device holding units 41, and the liquid pressure-feed unit 42 via the tubular members 45 and cools the liquid crystal panels 341R, 341G, 341B.

Specifically, the liquid crystal panels 341R, 341G, 341B generate heat when the lights output from the light sources 311 are applied thereto. The heat generated in the liquid crystal panels 341R, 341G, 341B transfers to the cooling liquid via the optical device holding units 41R, 41G, 41B, respectively. In the optical device holding units 41R, 41G, 41B, the cooling liquid sequentially flows in the optical device holding unit 41B, the optical device holding unit 41G, and the optical device holding unit 41R, then, sequentially flows in the liquid pressure-feed unit 42 and the feed tank 43, and flows into the heat receiving part 51 of the heat exchange unit 5.

The cooling liquid flowing in the heat receiving part 51 transfers the heat to the heat receiving part 51 when flowing in the plurality of micro channels within the heat receiving part 51.

The heat transferring to the heat receiving part 51 transfers to the heat absorbing parts 52a of the Peltier devices 52 via the heat transfer member 54. When the heat transfers to the heat absorbing parts 52a, the Peltier devices 52 absorb the heat and the heat generating parts 52b generate heat. The heat of the heat generating parts 52b transfers to the heat sink 53 and the heat pipe 57 via the support member 56.

The stacking part 53A of the heat sink 53 and the interior part 57A of the heat pipe 57 are located in locations opposed to the heat generating parts 52b via the support member 56, and the amounts of generated heat are particularly larger.

In the heat pipe 57, the interior part 57A generates heat, and thereby, the hydraulic fluid within the interior part 57A is evaporated and the vapor generated within the interior part 57A moves to the first extending part 57B and the second extending part 57C. The vapor moving to the first extending part 57B and the second extending part 57C is condensed in the first extending part 57B and the second extending part 57C and moves to the interior part 57A through the capillary-shaped channel within the heat pipe 57. In this manner, the hydraulic fluid convects between the interior part 57A and the first extending part 57B and the second extending part 57C, and thereby, the heat pipe 57 transfers the heat of the interior part 57A to the first extending part 57B and the second extending part 57C.

The heat of the first extending part 57B and the second extending part 57C transfers to the first projecting part 53B and the second projecting part 53C of the heat sink 53.

The heat transferring to the stacking part 53A, the first projecting part 53B and the second projecting part 53C transfers to the fins 532 and dissipated by the cooling air blown from the cooling fan 46.

As described above, the heat transferring to the heat receiving part 51 is transferred to the heat sink 53 via the heat transfer member 54, the Peltier devices 52, the support member 56, and the heat pipe 57, and dissipated by the cooling fan 46. The air that has cooled the heat sink 53 cools the light source devices 31A, 31B, and then, is ejected from the exhaust port (not shown) provided in the exterior housing 2 to the outside of the projector 1.

Then, the heat transferring to the heat receiving part 51 is dissipated by the heat exchange unit 5, and thereby, the cooling liquid within the heat receiving part 51 is cooled, and sequentially flows in the optical device holding unit 41B, the optical device holding unit 41G, and the optical device holding unit 41R, and cools the liquid crystal panels 341B, 341G, 341R.

Further, the heat pipe 57 is formed to move the hydraulic fluid by the capillary force, and thereby, even in a position in which the interior part 57A (evaporation part) is located above the first extending part 57B (condensation part) and the second extending part 57C (condensation part), may move heat from the interior part 57A (evaporation part) to the first extending part 57B (condensation part) and the second extending part 57C (condensation part). That is, the cooling device 4 may stably cool the liquid crystal panels 341R, 341G, 341B even when the projector 1 is changed in various positions.

As described above, the cooling device 4 includes the heat exchange unit 5 having the heat pipe 57, and cools the liquid crystal panels 341R, 341G, 341B by effectively utilizing the size of the heat sink 53.

As explained above, according to the embodiment, the following advantages may be obtained.

(1) In the heat pipe 57, the interior part 57A may be formed as the evaporation part and the first extending part 57B and the second extending part 57C may be formed as the condensation parts, and thus, the heat transferring from the Peltier devices 52 may be efficiently transferred to the first projecting part 53B and the second projecting part 53C of the heat sink 53 by the heat pipe 57. Accordingly, even when the heat sink 53 larger than the Peltier devices 52 is formed, the performance of the heat sink 53 may be sufficiently exhibited for dissipation of the heat of the heat receiving part 51 and the liquid crystal panels 341 may be efficiently cooled. Therefore, the projector 1 that can project images with better image quality over a longer period may be provided.

Further, a smaller fan may be used as the cooling fan 46 for dissipating the heat of the heat sink 53 and the cooling fan 46 may be driven with lower power, and thereby, upsizing and noise of the projector 1 may be suppressed.

(2) Two of the Peltier devices 52 are provided and the first projecting part 53B and the second projecting part 53C of the heat sink 53 are provided in the parallel arrangement direction of the two Peltier devices 52. Further, the heat exchange unit 5 is provided so that the direction orthogonal to the parallel arranged direction in which the two Peltier devices 52 are arranged in parallel may be along the thickness direction of the projector 1. Thereby, compared to the case of using single Peltier device 52, desired thermoelectric conversion performance may be exhibited even using the smaller Peltier devices, and thus, increase in thickness of the projector 1 may be suppressed and the liquid crystal panels 341 may be efficiently cooled.

Further, the number of Peltier devices 52 may be set in response to projectors requiring different cooling performance, and thus, the Peltier devices 52 may be commonalized and mounted on various projectors without newly manufacturing of Peltier devices in different sizes.

(3) The two Peltier devices 52 are provided to partially project from the heat receiving part 51 as seen from the heat receiving part 51 side, however, the heat transfer member 54 having the size covering the two Peltier devices 52 is provided between the two Peltier devices 52 and the heat receiving part 51, and accordingly, the heat from the heat receiving part 51 may be transferred to the whole heat absorbing parts 52a of the Peltier devices 52. Thereby, the performance of the two Peltier devices 52 may be sufficiently exhibited for allowing the heat absorbing parts 52a to efficiently absorb the heat from the heat receiving part 51 and allowing the heat generating parts 52b to generate heat.

Further, the number of Peltier devices 52 is set in response to projectors requiring different cooling performance of the cooling devices and the heat transfer members having the sizes matching the plurality of Peltier devices 52 are used, and thereby, the projector that can efficiently cools the liquid crystal panels 341 may be obtained without newly manufacturing of heat receiving parts in larger sizes. Therefore, the expensive heat receiving part 51 having the complex structure may be formed as a common member that can be mounted on various projectors.

(4) The heat sink 53 has the projecting parts (first projecting part 53B and second projecting part 53C) on both sides of the stacking part 53A and the heat pipe 57 has the extending parts (first extending part 57B and second extending part 57C) respectively along the projecting parts on both sides. Thereby, the heat transferring from the Peltier devices 52 to the stacking part 53A may be diffused to both sides of the stacking part 53A and the heat transferring from the Peltier devices 52 to the interior part 57A of the heat pipe 57 may be transferred from the extending parts to the projecting parts on both sides of the stacking part 53A. Thus, the performance of the heat sink 53 may be sufficiently exhibited for dissipation of the heat of the heat receiving part 51 and the liquid crystal panels 341 may be efficiently cooled.

(5) The cooling device 4 includes the heat pipe 57 that moves the hydraulic fluid by the capillary force and may stably cool the liquid crystal panels 341 even when the projector 1 is changed in various positions. Therefore, even in a position in which the projector 1 is rotated around the center axis along the optical axis 35Ax of the projection lens 35 (see FIG. 1) or a position in which the angle of the optical axis 35Ax with respect to the horizontal plane is changed, the cooling device 4 may reliably cool the liquid crystal panels 341. Thus, projection may be performed not only in the horizontal position in which landscape images are projected on a screen placed on a wall or the like but also in a vertical position in which portrait images are projected and positions in which landscape images and portrait images are projected above and below, and the projector 1 that may be placed according to various scenes may be provided.

(6) The cooling device 4 includes the liquid pressure-feed unit 42, the feed tank 43, the heat receiving part 51, the optical device holding units 41B, 41G, 41R, and the tubular members 45, and the annular channel in which the cooling liquid circulates formed therein.

Thereby, the heat generated in the liquid crystal panels 341 due to the lights from the light sources 311 may be transferred to the heat receiving part 51 via the cooling liquid. Further, as described above, the cooling device 4 efficiently transfers the heat of the heat receiving part 51 to the heat sink 53 using the Peltier devices 52 and heat pipe 57, and accordingly, the cooling liquid may be efficiently cooled. Thus, cooling of the optical device holding units 41 in which the cooling liquid cooled in the heat receiving part 51 circulates, and efficient cooling of the liquid crystal panels 341 may be performed.

Second Embodiment

As below, a projector according to the second embodiment will be explained with reference to the drawings. In the following explanation, the same configurations and the same members as those of the projector 1 of the first embodiment have the same signs and their detailed explanation will be omitted or simplified.

The projector of the embodiment (not shown) includes a heat exchange unit 7 having a different configuration from that of the heat exchange unit 5 in the projector 1 of the first embodiment.

Figure 7:
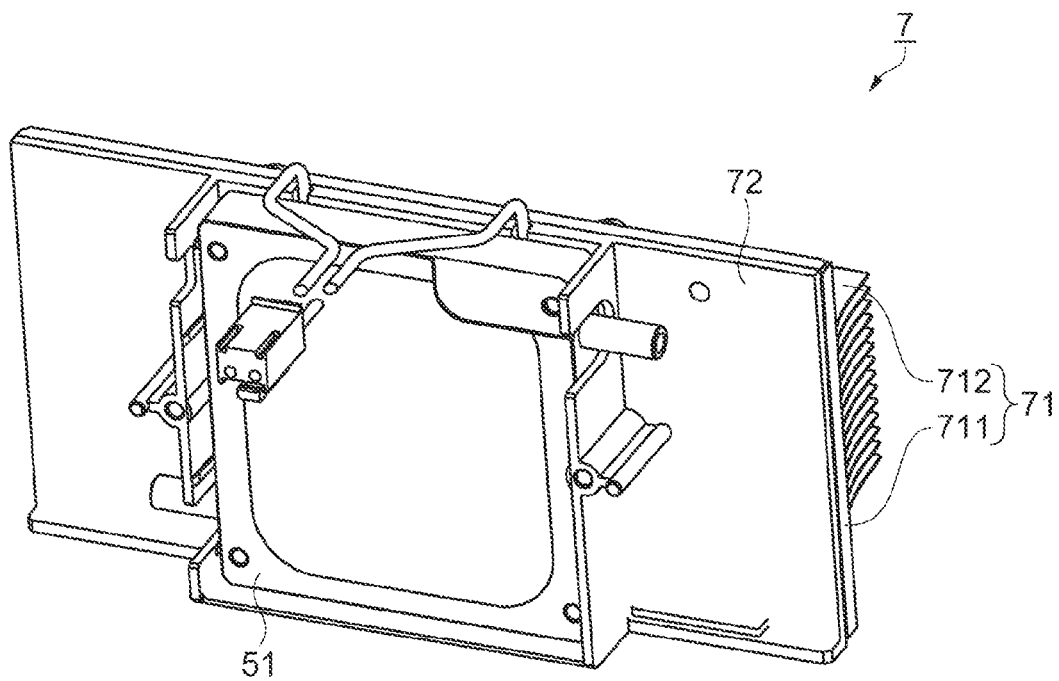
FIG. 7 is a perspective view of a heat exchange unit in the second embodiment.
Figure 8A:
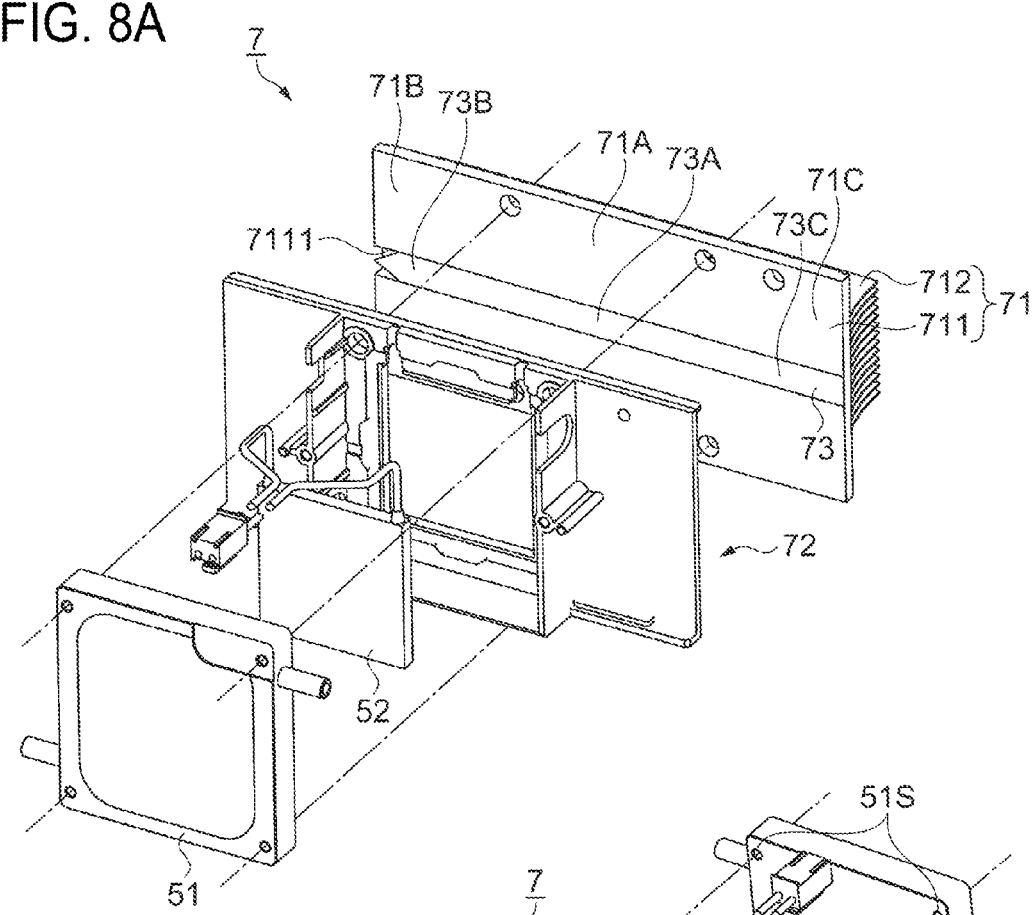
FIGS. 8A and 8B are exploded views of the heat exchange unit in the second embodiment.
Figure 8B:
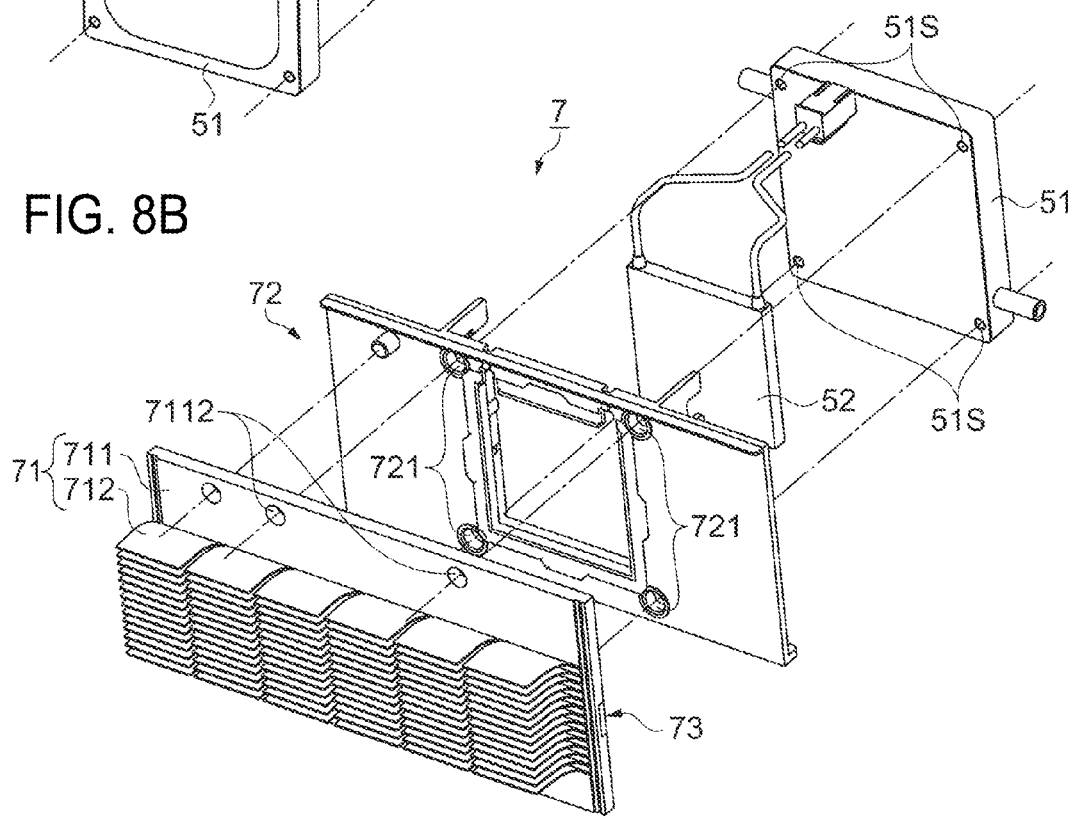
Figure 9:
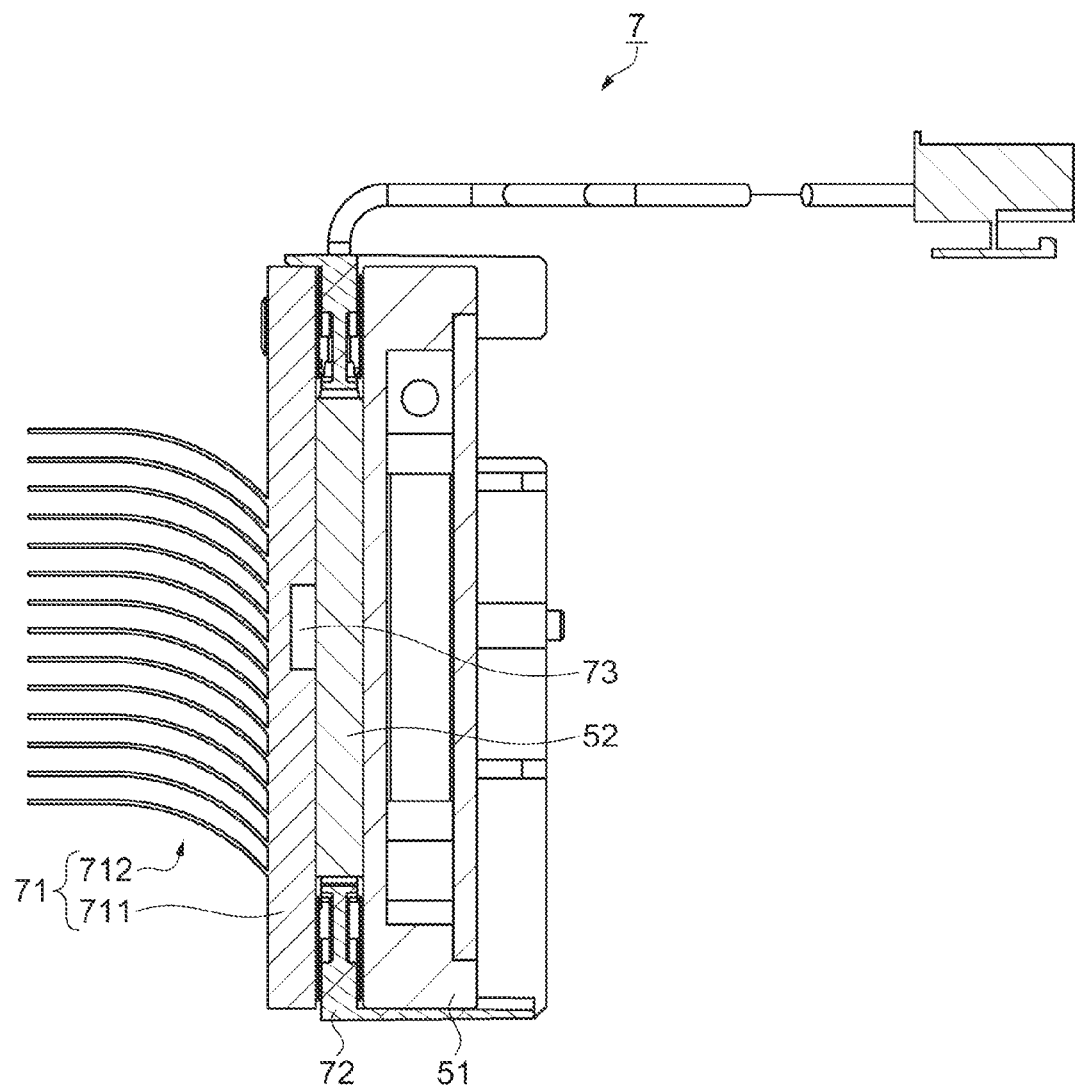
FIG. 9 is a sectional view of the heat exchange unit in the second embodiment.

FIG. 7 is a perspective view of the heat exchange unit 7 of the embodiment. FIGS. 8A and 8B are exploded views of the heat exchange unit 7, and FIG. 8A is a view seen from one side and FIG. 8B is a view seen from the other side. FIG. 9 is a sectional view of the heat exchange unit 7.

As shown in FIGS. 7, 8A, and 8B, the heat exchange unit 7 of the embodiment includes a heat sink 71, a fixing frame 72, and a heat pipe 73 having different shapes from those of the heat sink 53, the fixing frame 55, and the heat pipe 57 in the heat exchange unit 5 of the first embodiment in addition to a heat receiving part 51 and one Peltier device 52. The heat exchange unit 7 of the embodiment has a configuration without members corresponding to the heat transfer member 54 and the support member 56 in the heat exchange unit 5 of the first embodiment. Further, the heat pipe 57 of the first embodiment is adapted to be held by the support member 56, however, the heat pipe 73 of the second embodiment is adapted to be held by the heat sink 71.

As shown in FIG. 9, the heat exchange unit 7 has a configuration in which the heat receiving part 51, the Peltier device 52, the heat pipe 73, and the heat sink 71 are stacked.

Further, the Peltier device 52 is provided to be located nearly at the center of the heat receiving part 51.

As shown in FIG. 8A, the heat sink 71 has a plate-like base part 711 and a plurality of fins 712 projecting from one surface of the base part 711.

The base part 711 is formed in a rectangular-plate shape in the plan view, and the size in the lateral direction is formed to be nearly equal to the size of the heat receiving part 51 and the size in the longitudinal direction is formed to be larger than the size of the heat receiving part 51. Further, the heat receiving part 51 is provided nearly at the center in the longitudinal direction with respect to the base part 711. That is, as shown in FIG. 8A, the heat sink 71 has a stacking part 71A superimposed on the Peltier device 52, and a first projecting part 71B located at one side of the stacking part 71A in the longitudinal direction and a second projecting part 71C provided at the other side of the stacking part 71A as seen from the Peltier device 52 side.

In the base part 711, a concave part 7111 for placement of the heat pipe 73 is provided on the surface opposite to the plurality of fins 712, and the heat pipe 73 is placed in the concave part 7111.

As shown in FIG. 8A, the heat pipe 73 has an interior part 73A located between the Peltier device 52 and the stacking part 71A, a first extending part 73B extending along the first projecting part 71B, and a second extending part 73C extending along the second projecting part 71C.

Screws SC inserted from the side on which the fins 712 of the heat sink 71 are formed into insertion holes 7112, 712 (see FIG. 8B) provided in the base part 711 and the fixing frame 72, respectively, are screwed into screw grooves 51S of the heat receiving part 51, and thereby, the heat exchange unit 7 is integrated.

The heat exchange unit 7 is integrated, and thereby, heat transfer routes from the heat receiving part 51 through the Peltier device 52 to the heat sink 71 and from the Peltier device 52 through the heat pipe 73 to the heat sink 71 are formed.

Like the explanation in the first embodiment, the heat exchange unit 7 transfers the heat received by the heat receiving part 51 to the heat sink 71 via the Peltier device 52 and the heat pipe 73. Further, in the heat pipe 73, like the heat pipe 57 of the first embodiment, the interior part 73A functions as an evaporation part and the first extending part 73B and the second extending part 73C function as condensation parts, and the heat from the Peltier device 52 is transferred to the first projecting part 71B and the second projecting part 71C of the heat sink 71. Then, the heat transferring to the heat sink 71 is dissipated by cooling air blown by a cooling fan 46.

As explained above, according to the embodiment, the following advantages may be obtained in addition to the advantages (1), (4) to (6) of the first embodiment.

Compared to the heat exchange unit 5 of the first embodiment, the heat exchange unit 7 is lower in performance of heat exchange, however, the number of parts is smaller and the size and the weight are reduced, and accordingly, a cooling device simplified in manufacturing with reduced size and weight may be realized. Thus, for example, the heat exchange unit 7 is mounted on a cooling device of a projector that projects projection light with lower brightness than that of the projection light of the projector 1 of the first embodiment, and thereby, a projector including a cooling device simplified in manufacturing with reduced size and weight may be provided.

The embodiments may be changed to have the following configurations.

Modified Example 1

The heat exchange units 5, 7 of the embodiments include single heat pipes 57, 73 having shapes nearly along straight lines, however, the number and shape of the heat pipes are not limited to those.

FIGS. 10A to 10D are schematic diagrams of heat exchange units 8A, 8B, 8C, 8D showing a modified example of the heat exchange unit 7 including the single Peltier device 52, and plan views showing the Peltier devices 52, heat pipes, and heat sinks 82.

Figure 10A:
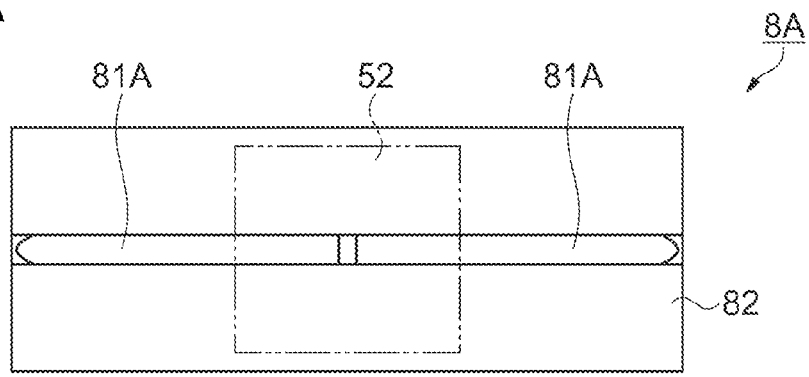
FIGS. 10A to 10D are schematic diagrams of heat exchange units in a modified example.

As the heat exchange unit 8A shown in FIG. 10A, two heat pipes 81A each having length nearly a half of the length of the heat pipe 73 of the second embodiment may be provided, and the two heat pipes 81A may be placed along one straight line.

Figure 10B:
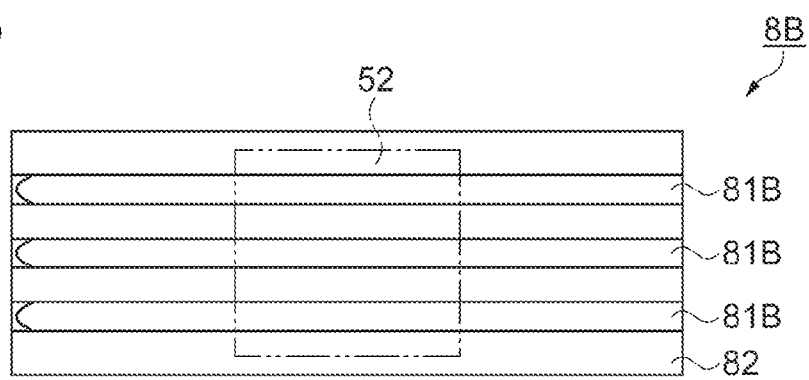

As the heat exchange unit 8B shown in FIG. 10B, a plurality of heat pipes 81B extending along a straight line like the heat pipe 73 of the second embodiment are provided, and the plurality of heat pipes 81B may be arranged in parallel in a direction orthogonal to the extension direction of the heat pipes 81B. Further, heat pipes having different thicknesses may be arranged in parallel.

As the shape of the heat pipe, a shape along a curved line or with bending parts may be employed. For example, as the heat exchange unit 8C shown in FIG. 10C, bending parts may be provided in a first extending part 81Ca and a second extending part 81Cb of a heat pipe 81C. Further, as the heat exchange unit 8D shown in FIG. 10D, two heat pipes 81D formed in U-shapes may be provided and the two heat pipes 81D may be arranged so that the valley parts of the U-shapes may serve as evaporation parts and the separated parts of the U-shapes may serve as condensation parts.

Figure 10C:
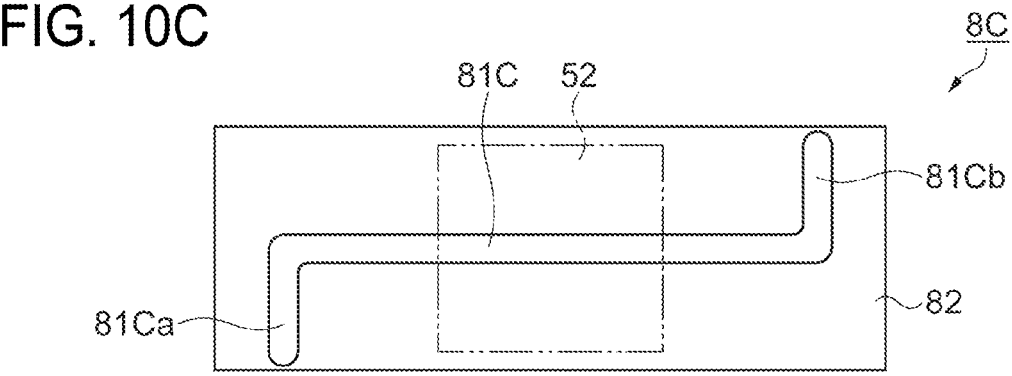
Figure 10D:
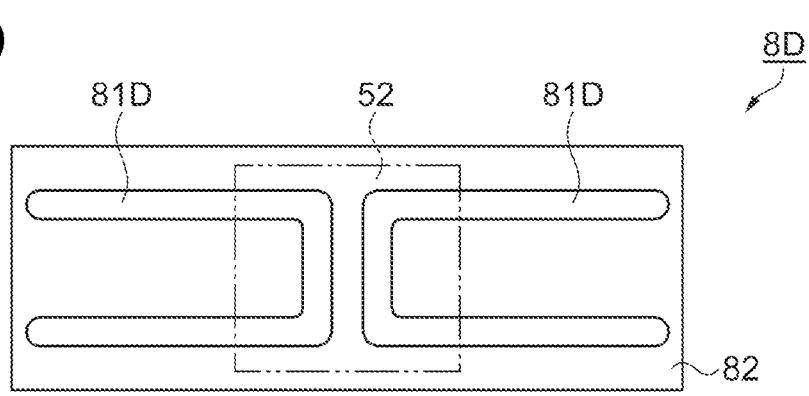

In the forms shown in FIGS. 10B to 10D, the extending parts of the heat pipes may be provided along the projecting parts projecting from the Peltier device 52 in the heat sink 82 in wider ranges, and the heat from the Peltier device 52 may be efficiently transferred to the heat sink 82.

The heat pipes of the above described modified example may be combined. Further, a plurality of heat pipes may be arranged in parallel in a direction in which the members forming the heat exchange unit are stacked. Further, the above described modified example may be applied to a heat exchange unit including a plurality of Peltier devices 52.

Modified Example 2

The heat exchange unit 5 of the first embodiment is formed so that the length of the first projecting part 53B and the length of the second projecting part 53C may be nearly equal, however, the length of the first projecting part 53B and the length of the second projecting part 53C may be different.

Further, the heat exchange unit 5 may be formed so that the length of the first projecting part 53B located at the side of the cooling fan 46 that blows cooling air may be shorter than the length of the second projecting part 53C. That is, the cooling air is blown from the side at which the amount of projection from the Peltier device 52 is smaller (the first projecting part 53B side) toward the side at which the amount is larger (the second projecting part 53C side). Thereby, the cooling air is blown to the heat sink 53 from the side nearer the stacking part 53A of the heat sink 53, i.e., the part in which the temperature is higher in the heat sink 53, and thus, the heat of the heat sink 53 may be efficiently dissipated.

As is the above described case, the length of the first projecting part 71B and the length of the second projecting part 71C of the second embodiment may be formed to be different. Further, the cooling air may be blown from the side at which the amount of projection from the Peltier device 52 is smaller (the first projecting part 71B side) toward the side at which the amount is larger (the second projecting part 71C side).

Further, in the heat exchange units 5, 7, the projecting parts are provided on both sides of the stacking parts 53A, 71A, however, the projecting parts may be provided on single sides of the stacking parts 53A, 71A.

Modified Example 3

The heat exchange unit 5 of the first embodiment includes two of the Peltier devices 52, however, a heat exchange unit may include three or more of the Peltier devices 52.

Modified Example 4

In the embodiments, the liquid crystal panels 341 are formed as optical devices, however, the other optical components than the liquid crystal panels 341, for example, the light incident-side polarizers 342, the light exiting-side polarizers 343, the polarization conversion element 323, and the light sources 311 may be formed as optical devices. Further, the cooling device 4 may be adapted to cool the optical devices.

The optical unit 3 may include a retardation film, a compensation element that compensates for phase shift of light, etc. and the retardation film, the compensation element, etc. may be formed as optical devices. Further, the cooling device 4 may be adapted to cool the optical devices.

The projector 1 of the embodiments uses the transmissive liquid crystal panels as the light modulator, however, reflective liquid crystal panels may be used.

Further, the light modulator of the embodiments employs the so-called 3-LCD system using three light modulators corresponding to R-light, G-light, and B-light, however, not limited to that. A single-LCD system may be employed or the invention may be applied to a projector including two or four or more light modulators.

Furthermore, as the light modulator, a micromirror light modulator using a DMD (Digital Micromirror Device) or the like may be used.

Modified Example 5

The projector 1 of the embodiments includes the two light source devices 31A, 31B, however, not limited to that. One or three or more light source devices may be provided. Further, the light source device is not limited to that using the discharge light source 311, but a light source of another system or a solid light source such as a light emitting diode, laser, or the like may be used.

The entire disclosure of Japanese Patent Application No. 2013-250839, filed Dec. 4, 2013 is expressly incorporated by reference herein.

What is claimed is:

1. A projector that modulates light output from a light source in response to image information and projects the modulated light, the projector including a cooling device that cools within the projector, the cooling device comprising:
  a heat receiving part that receives heat within the projector;
  a thermoelectric conversion element having a heat absorbing part that absorbs the heat of the heat receiving part and a heat generating part that generates heat when the heat absorbing part absorbs heat;
  a heat sink provided so that heat may be transferred from the heat generating part; and
  a heat pipe containing a hydraulic fluid inside, in which heat is transferred by reception of heat of the heat generation part and convection of the hydraulic fluid,
wherein
  the heat sink has a stacking part superimposed on the thermoelectric conversion element and a projecting part projecting from the thermoelectric conversion element as seen from the thermoelectric conversion element side,
  the heat pipe has an interior part located between the thermoelectric conversion element and the stacking part and an extending part extending along the projecting part,
  the cooling device includes a plurality of the thermoelectric conversion elements arranged in parallel,
  the projecting part is provided in a parallel arrangement direction of the plurality of thermoelectric conversion elements,
  the cooling device further includes a heat transfer member provided between the heat receiving part and the plurality of thermoelectric conversion elements for transferring the heat of the heat receiving part to the heat absorbing parts of the plurality of thermoelectric conversion elements, and
  the heat transfer member has a size covering the plurality of thermoelectric conversion elements as seen from the heat receiving part side.

2. The projector according to claim 1, wherein the projecting part in the heat sink has a first projecting part located at one side of the stacking part and a second projecting part located at the other side of the stacking part, and
  the extending part in the heat pipe has a first extending part along the first projecting part and a second extending part along the second projecting part.

3. The projector according to claim 2, wherein an amount of projection of the first projecting part from the thermoelectric conversion element is smaller than an amount of projection of the second projecting part from the thermoelectric conversion element, and
  the cooling device further includes a cooling fan that blows cooling air from the first projecting part side to the heat sink.

4. The projector according to claim 1, wherein the heat pipe has a capillary-shaped channel for moving the hydraulic fluid by a capillary force.

5. The projector according to claim 1, wherein the heat receiving part has a channel in which a cooling liquid circulates inside, the cooling device further includes:
- an optical device holding unit having a channel in which the cooling liquid circulates inside and holding the optical device;
- a liquid pressure feeding unit that suctions and pressure-feeds the cooling liquid;
- a feed tank that retains the cooling liquid inside;
- a tubular member that connects the optical device holding unit, the liquid pressure feeding unit, the feed tank, and the heat receiving part so that the cooling liquid may annularly circulate in the optical device holding unit, the liquid pressure feeding unit, the feed tank, and the heat receiving part.

6. A projector that modulates light output from a light source in response to image information and projects the modulated light, the projector including a cooling device that cools within the projector, the cooling device comprising:
- a heat receiving part that receives heat within the projector;
- a thermoelectric conversion element having a heat absorbing part that absorbs the heat of the heat receiving part and a heat generating part that generates heat when the heat absorbing part absorbs heat;
- a heat sink provided so that heat may be transferred from the heat generating part; and
- a heat pipe containing a hydraulic fluid inside, in which heat is transferred by reception of heat of the heat generation part and convection of the hydraulic fluid, wherein
  - the heat sink has a stacking part superimposed on the thermoelectric conversion element and a projecting part projecting from the thermoelectric conversion element as seen from the thermoelectric conversion element side,
  - the heat pipe has an interior part located between the thermoelectric conversion element and the stacking part and an extending part extending along the projecting part,
  - the projecting part in the heat sink has a first projecting part located at one side of the stacking part and a second projecting part located at the other side of the stacking part,
  - the extending part in the heat pipe has a first extending part along the first projecting part and a second extending part along the second projecting part,
  - an amount of projection of the first projecting part from the thermoelectric conversion element is smaller than an amount of projection of the second projecting part from the thermoelectric conversion element, and
  - the cooling device further includes a cooling fan that blows cooling air from the first projecting part side to the heat sink.

7. The projector according to claim 6, wherein the cooling device includes a plurality of the thermoelectric conversion elements arranged in parallel, and the projecting part is provided in a parallel arrangement direction of the plurality of thermoelectric conversion elements.

8. The projector according to claim 7, wherein the cooling device further includes a heat transfer member provided between the heat receiving part and the plurality of thermoelectric conversion elements for transferring the heat of the heat receiving part to the heat absorbing parts of the plurality of thermoelectric conversion elements, and the heat transfer member has a size covering the plurality of thermoelectric conversion elements as seen from the heat receiving part side.

9. The projector according to claim 6, wherein the heat pipe has a capillary-shaped channel for moving the hydraulic fluid by a capillary force.

10. The projector according to claim 6, wherein the heat receiving part has a channel in which a cooling liquid circulates inside, the cooling device further includes:
- an optical device holding unit having a channel in which the cooling liquid circulates inside and holding the optical device;
- a liquid pressure feeding unit that suctions and pressure-feeds the cooling liquid;
- a feed tank that retains the cooling liquid inside;
- a tubular member that connects the optical device holding unit, the liquid pressure feeding unit, the feed tank, and the heat receiving part so that the cooling liquid may annularly circulate in the optical device holding unit, the liquid pressure feeding unit, the feed tank, and the heat receiving part.

* * * * *